Jan. 11, 1938.  H. M. HAAGENSON  2,104,986
WATER SOFTENER AND METHOD OF SOFTENING WATER
Filed April 11, 1935
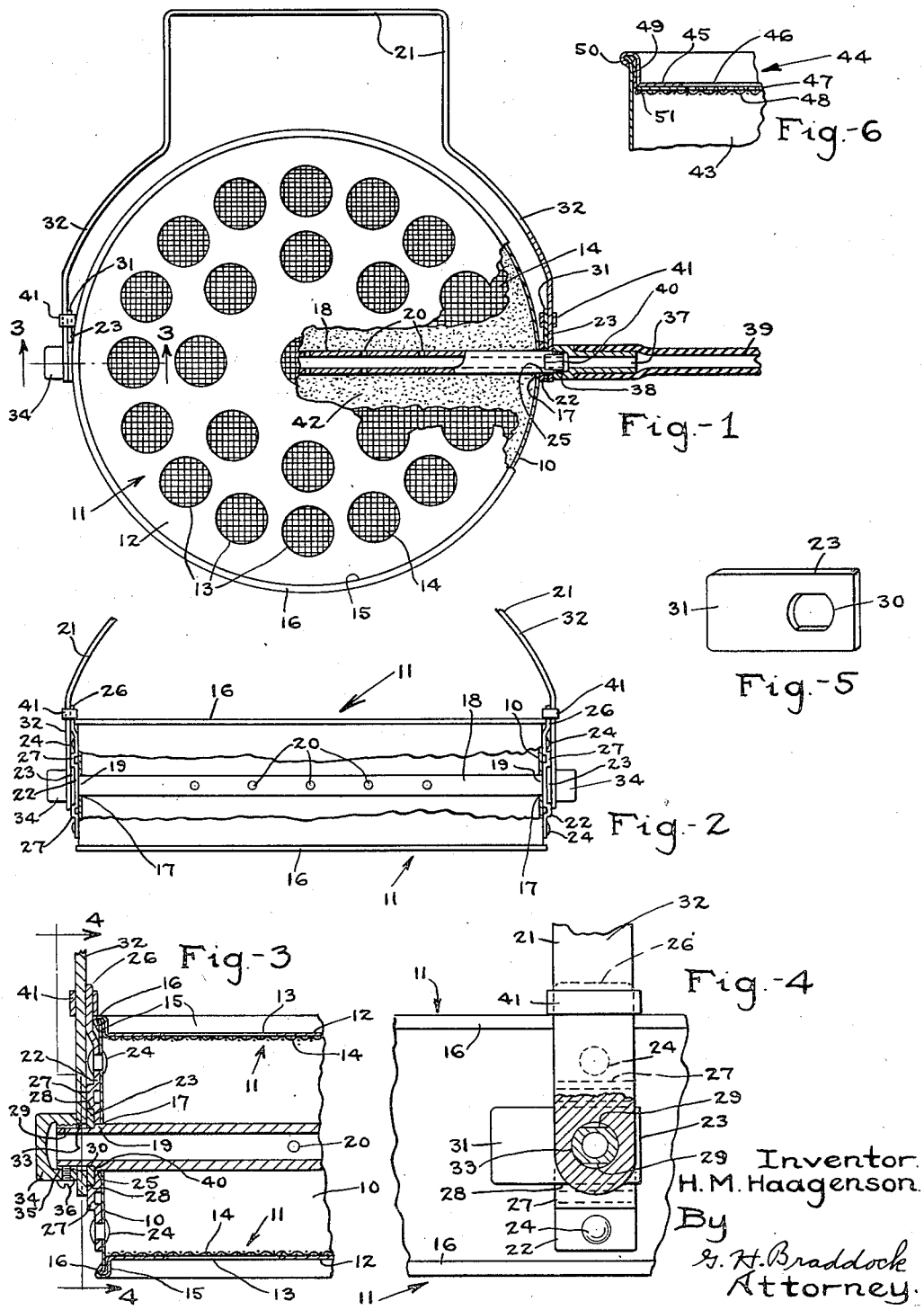
Inventor.
H. M. Haagenson.
By
G. H. Braddock
Attorney.

Patented Jan. 11, 1938

2,104,986

UNITED STATES PATENT OFFICE 2,104,986

WATER SOFTENER AND METHOD OF SOFTENING WATER

Helmer M. Haagenson, Excelsior, Minn.

Application April 11, 1935, Serial No. 15,812

9 Claims. (Cl. 210—24)

This invention has relation to a water softener and to a method of softening water.

An object of the invention is to provide a novel and improved method of softening water.

A further object is to provide a novel and improved apparatus or device adapted to be employed as a container for water softening medium.

And a further object is to provide an apparatus or device containing zeolite, or other equivalent or suitable substance, for causing water to be softened, and in which apparatus or device will be incorporated various improved features and characteristics of construction novel both as individual entities of the apparatus or device and in combination with each other.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a plan view, partially in section and partially broken away, of an apparatus or device for softening water made according to the invention, the handle of the apparatus or device being disclosed as when at a side of the body thereof, in the plane of said body;

Fig. 2 is a side elevational view of the apparatus or device of Fig. 1, parts being broken away and in section, the handle of said apparatus or device being disclosed as when above the body thereof, at right angles to the plane of said body, and the faucet connection being replaced by a closure cap for the water pipe of the apparatus or device;

Fig. 3 is an enlarged detail sectional view of the apparatus or device, taken as on line 3—3 in Fig. 1, but with the handle positioned as in Fig. 2;

Fig. 4 is a detail sectional view, taken as on line 4—4 in Fig. 3;

Fig. 5 is a view detailing one of the plate members of the apparatus or device which cooperate in the structure to fixedly situate the water pipe of the apparatus or device and to detachably fasten the handle in one of its adjusted positions; and Fig. 6 is a detail sectional view of an apparatus or device of modified construction including the features of the invention.

With respect to Figs. 1 to 5 of the drawing, and the numerals of reference thereon, the body of the apparatus or device is made in the form of a drum consisting of a cylinder or annular member 10 having heads 11 attached to the opposite ends thereof.

The cylinder or annular member 10 may consist of any suitable material, desirably metal, and may be a single piece or strip, or several pieces or strips conveniently joined together, as by welding, soldering or riveting. As shown, the material or metal of which the cylinder or annular member 10 is composed is not perforated.

The heads 11 are duplicates, each head consisting of a plate 12 of metal, or other suitable material, having a number of openings 13 therein, and a screen 14 at the inner side of the plate. As disclosed more clearly in Fig. 3, each head 11 is fitted down into the cylinder or annular member 10, and the marginal portion of the head, including both the plate 12 and the screen 14, is bent outwardly of the cylinder or annular member, as at 15, and thence spun about or over the adjacent or corresponding end of said cylinder or annular member, as at 16.

The cylinder or annular member 10 includes diametrically opposed openings 17 arranged at the midlength of said cylinder or annular member, that is, at equal distance from the heads 11, and the opposite end portions of a water conveying pipe 18 are snugly fitted to said openings 17 as shown very clearly at 19. The water conveying pipe 18 has a series of ports 20 in each side of the pipe and arranged to direct streams of water toward the cylinder or annular member 10. That is, the streams of water are directed by the ports 20 to flow in a plane which is parallel with the planes of the heads 11.

The apparatus or device includes a handle 21 for the drum, and a pair of plate members, denoted 22 and 23, respectively, adjacent each opening 17, cooperate in the structure to detachably fasten the handle in different positions of adjustment and to fixedly situate the ported water conveying pipe so that the ports 20 thereof extend in planes parallel with the heads 11 to always direct water which passes through the pipe 18 toward the cylinder or annular member 10, as before stated. While the cylinder or annular member 10 is disclosed as not perforated, it could of course be perforated to a greater or less extent, or could even be constituted as a screen.

Each plate member 22 is riveted, or otherwise fastened, as at 24, to the outer surface of the cylinder or annular member, and includes an opening 25 in alinement with the next adjacent opening 17. The openings 25 are the same size as the openings 17, and the opposite end portions of the water conveying pipe 18 are snugly mounted in said openings 25, as well as in the openings 17. An outer portion 26 of each plate member 22 extends to a position a short distance beyond an end of the cylinder or annular member, desirably perpendicularly to the drum, as will be clear from the drawing. As disclosed, both portions 26 are at the same end of the drum. If considered preferable, portions such as 26 of the plate members 22 could also extend to position beyond the opposite end of the drum.

Each plate member 22 is provided with a pair of spaced apart ridges or bosses, denoted 27, which are situated at the outer sides of said plate members 22 and at opposite sides of the ported water conveying pipe 18, in spaced relation to said pipe. The ridges or bosses 27 can be produced by suitably bending each plate member 22, or can be supplied in any other preferred manner. Said ridges or bosses in the instance of each plate member 22 provide opposed shoulders 28 which are spaced apart a distance equal to the width of each plate member 23. As shown, the shoulders 28 extend in planes parallel with the planes of the drum heads 11.

The opposite end portions of the ported water conveying pipe 18 are cut away slightly, as denoted at 29, to present reduced, flattened surfaces extending from the locations of said opposite end portions of the water pipe which are mounted in the openings 25 to the outer ends of said pipe.

Each plate member 23 is removably fitted between a set of opposed shoulders 28, 28, and includes an opening 30 of configuration to be slid over and snugly fitted upon a reduced, flattened end portion of the water pipe 18. It will be apparent that when the plate members 23 are upon the reduced, flattened portions at the opposite ends, respectively, of the water pipe 18, and are fitted between the opposed shoulders 28, 28, respectively, at the opposite sides of the cylinder or annular member, said water pipe will be fixed against turning movement in the drum. The arrangement is such that when said water pipe is so fixed against turning movement, the ports 20 thereof open in direction toward the cylinder or annular member, as hereinbefore set forth, and as very clearly illustrated in Figs. 1, 2 and 3.

Also, when the plate members 23 are fitted between the different sets of shoulders and upon the reduced, flattened portions of the water pipe, in the manner as stated, said plate members 23 are located with respect to the drum. An outer portion 31 of each plate member 23 extends toward a side of the drum to location a short distance from the adjacent plate member 22, and is desirably perpendicular to said adjacent plate member 22. As disclosed, both portions 31 extend toward the same side of the drum. If considered preferable, portions such as 31 of the plate members 23 could likewise extend toward the opposite side of the drum from the locations of the plate members 22.

While I have described the elements 22 and 23 as plate members, it is to be understood that these could evidently just as well be of cast as of sheet metal material. And said plate members need not of necessity be metallic. They need only to be rigid.

The handle 21 is resilient and of general U-shape, including legs 32 which are rotatably mounted, as at 33, upon the reduced end portions of the water pipe 18 just outside of and adjacent to the plate members 22 and 23.

In some uses of the apparatus or device, a closure cap 34 at each end of the water pipe is threaded thereon as at 35, and each closure cap is fastened in position by a set screw 36. In other uses, one of the closure caps 34 is replaced by a tubular fitting 37 threaded upon the water pipe as at 38 and adapted to receive a hose connection 39 for attachment to a faucet (not shown). The closure caps 34 and the tubular fitting 37 are at the outer sides of the legs 32 of the handle and retain said legs upon the reduced portions 29. When the closure caps 34, or a closure cap 34 and the tubular fitting 37, are turned against the legs 32 of the handle to cause said legs to be contiguous with the outer surfaces of the ridges or bosses 27 and the outer surfaces of the plate members 23, which latter outer surfaces are desirably about flush with said outer surfaces of the ridges or bosses, each plate member 23 is held closely adjacent to or contiguous with a shoulder 40 at the corresponding end portion of the water pipe, provided by the cut-away portions 29. Thus said water pipe is fixed in the drum against endwise movement, the legs of the handle are located on the reduced portions of the water pipe, and the plate members 23 are retained between the shoulders 28, 28, respectively, to fix the water pipe against turning movement.

Spring clips 41, one on each leg 32, are adapted to be removably and selectively fitted over either set of extensions 26 or 31 of the plate members 22 and 23, respectively, to thus cause the handle to be fastened in a chosen adjusted position.

The drum contains zeolite 42, or other equivalent or suitable substance or medium employed to soften water. The softening substance or medium is inserted into and removed from the drum through a set of openings 25, 17 while the water pipe 18 is removed from the drum. After the drum is loaded with softening substance or medium, the water pipe is inserted through one set of openings 25, 17, is pushed through the softening substance or medium, and is inserted in the opposite set of openings 17, 25. Then the plate members 23 are placed in position, the legs 32 of the handle are placed on the reduced end portions of the water pipe, and the nuts 34, or a nut 34 and the tubular fitting 37, as the case may be, are threaded onto the ends of the water pipe and turned home. To remove the water pipe from the drum, the operations as described are reversed.

The apparatus or device may be used in several different fashions. The hose 39 may be attached to a faucet, when the tubular fitting is applied to the water pipe, as in Fig. 1, and with the drum inserted in a container for water to be softened, the faucet may be turned on. The water to be softened enters the container by way of the apparatus or device, passing from the hose 39 to the tubular fitting 37 and the pipe 18, and thence through the ports 20 and the softening substance or medium to said container. While the water is so entering the container through the apparatus or device, this can be moved about, to and 'fro, in the container, to cause the softening substance or medium to be worked through the water, and the water in turn to be forced through the softening substance or medium. The extent to which the water is softened will of course depend upon the nature of the water as well as upon the length of time the softening substance or medium is left in the water and the extent to which said softening substance or medium is worked through the water. It might be here remarked that the ports 20 will ordinarily be of insufficient size to allow passage of granules of the softening substance or medium, but the water pipe 18 could of course be surrounded by a screen covering the outer ends of said ports 20.

When two closure caps 34 are employed, as in Fig. 2, and the hose 39 is omitted, the apparatus or device is moved about, to and fro, in water to be softened, in a container as before set forth, the only difference in an instance when both ends of the water conveying pipe are closed being that while the softening substance or medium is being worked through the water to cause water to be forced through said softening substance or medium, no additional water is entering, or being forced or drawn into, the container through the softening substance or medium.

It will be evident that the softening substance or medium can be revivified while in the drum by inserting the drum into brine solution, and moving the drum about, if desired, to force the brine solution through the softening substance or medium. Of course, upon removal of the drum from brine solution, said drum will be inserted, or inserted and worked, in fresh water to remove traces of salt from the softening substance or medium before it is again applied to soften water. Or fresh water can be run through the hose 39, the tubular fitting 37 and the ported water pipe 18 to clear out the brine solution, if this is preferable.

In Fig. 6 I have disclosed a fragment of a drum equivalent to the drum already described, including a cylinder or annular member 43 similar to the cylinder or annular member 10, with heads 44, one head being shown, for the same purpose as the heads 11, but of somewhat different structure. As disclosed in Fig. 6, each head 44 consists of an annular disc plate 45 of metal, or other suitable material, providing a single circular opening 46 of magnitude slightly less than the magnitude of the head, a perforated plate 47 at the inner side of the annular disc plate 45, and a screen 48 at the inner side of the perforated plate 47. Each head 44 is fitted down into the cylinder or annular member 43, and the marginal portions of both the annular disc plate 45 and the screen 48 are bent outwardly of the cylinder or annular member 43, as at 49, and spun about or over the adjacent or corresponding end of said cylinder or annular member, as at 50. The outer portion of the perforated plate 47 is thus clamped between the annular disc plate 45 and the screen 48, and the circumferential edge 51 of said perforated plate 47 terminates at the location where said disc plate 45 and said screen 48 are bent outwardly.

Attention is called to the fact that when water is being run through the apparatus or device, by way of the hose 39, the tubular fitting 37 and the ported water pipe 18, and said apparatus or device is at the same time being moved or worked through water in a container, water forced through the softening substance or medium by movement or working of said substance or medium in the water, meets water flowing into the container from the water conveying pipe at locations within the confines of said softening substance or medium. Thus there is created interiorly of the softening substance or medium, turbulence having tendency toward assisting and hastening the water softening process. Also, there is turbulence created within the softening substance or medium when the apparatus or device is moved to and fro through the water without added flow. In addition to assisting and hastening the softening process, the turbulence has tendency toward keeping the softening substance or medium in granular form, or properly broken up.

It may be desirable to move or work the apparatus or device in water by employment of the handle situated above the apparatus or device, as in Fig. 2, or at a side of the apparatus or device, as in Fig. 1. In the former event, said handle is, while released for rotative movement, turned to the position as in Fig. 2, and the clips 41 are slid downwardly over the extensions 26. In the latter event, the clips are released from the extensions 26, the handle is turned to the position as in Fig. 1, and said clips are slid inwardly over the extensions 31.

While I have described an apparatus or device and a method for softening water, it will be apparent that the apparatus, device and method can be employed to treat any fluid which, or the nature of which, is to be altered by contact with a substance, medium, or agent designed to the purpose.

Attention is called to the fact that the apparatus or device need not necessarily incorporate a drum of the actual structure as disclosed. There could, for example, be substituted for the drum, a perforated shell or vessel for softening substance or medium of cylindrical shape and having a ported water conveying pipe extending longitudinally of the cylinder, desirably at its axis. Or, the shell or vessel for softening substance or medium could be of any alternative and suitable design or shape, as conditions might dictate.

What is claimed is:

1. The method of softening water, which consists in causing water to flow through a softening medium therefor into a container, and concurrently moving said softening medium to and fro in water which has entered the container through the softening medium to thus force water through said softening medium in directions counter to the directions of flow of water through the softening medium into said container.

2. An apparatus for softening water, comprising a vessel having water softening medium therein adapted to be moved to and fro in water in a container, and means for causing water to flow through said softening medium into said container in direction counter to the direction of flow of water through the softening medium caused by to and fro movements of said softening medium concurrently with to and fro movement of the softening medium in water in said container which has flowed through said softening medium.

3. An apparatus for softening water, comprising a vessel, water softening medium in said vessel, and means for causing water to flow through said vessel and the softening medium therein and into a container for water to be softened, said vessel with softening medium being adapted to be moved to and fro in water in said container while aditional water is entering the container through said vessel and its softening medium in direction counter to the direction of flow of said water.

4. An apparatus of the character described, comprising a perforated vessel, a fluid treating agent in said vessel, bearings at opposite sides of said vessel, a U-shape handle having its legs rotatably mounted upon said bearings, fixed members adjacent each bearing, said fixed members extending at angular relation to each other, and a clip slidably arranged upon each leg of said handle and adapted to be removably engaged over selected ones of said fixed members, whereby to adjustably fasten said handle upon said vessel.

5. An apparatus of the character described, comprising a drum consisting of an annular member and perforated, parallel heads in the ends of said annular member, water softening medium in said drum, a ported water conveying pipe mounted in the wall of said annular member and extending across the annular member through said softening medium, extensions upon said water conveying pipe at opposite sides of said annular member, a handle having legs mounted upon said extensions, and means for selectively fastening said handle at a plurality of different positions of adjustment relatively to said drum.

6. An apparatus of the character described, comprising a drum consisting of an annular member and perforated, parallel heads in the ends of said annular member, water softening medium in said drum, a ported water conveying pipe mounted in the wall of said annular member and extending across the annular member through said softening medium, the ports in said water conveying pipe including a series of ports at each side of the pipe, directed toward said annular member, and means for fastening said water conveying pipe against turning movement in said drum.

7. An apparatus of the character described, comprising a vessel for fluid treating medium, a ported fluid conveying pipe removably mounted in openings in opposed surfaces of said vessel and extending through the vessel at the interior thereof, extensions upon the ends of said fluid conveying pipe at opposite sides of the vessel, a handle for the vessel having legs rotatably mounted upon said extensions, means for retaining said legs upon said extensions, and cooperating means for detachably fastening said handle in adjusted relation to said vessel and for situating said fluid conveying pipe in said vessel against the possibility of displacement.

8. In an apparatus of the character described, a vessel adapted to contain fluid treating medium, said vessel having oppositely arranged openings through the wall thereof, a ported fluid conveying pipe removably mounted in said openings and arranged across the interior of said vessel, either of said openings being adapted to constitute a passage for placing fluid treating medium in the vessel, reduced extensions upon said fluid conveying pipe at opposite sides of the vessel, a handle having portions thereof mounted upon said extensions, means for retaining said portions of the handle upon said extensions, and a pair of members at each side of said vessel cooperating to selectively fasten said handle at different adjusted positions relatively to the vessel and to fixedly situate said fluid conveying pipe in said vessel.

9. In an apparatus of the character described, a vessel wall, a plate member attached to the outer side of said wall, a member removably mounted in alining openings in said vessel wall and said plate member and having a reduced portion providing a shoulder at the outer side of said plate member, a handle member rotatably mounted upon said reduced portion, a second plate member upon said reduced portion and between said handle member and said first mentioned plate member, opposed shoulders upon said first plate member and engaging the sides of said second plate member, means upon said reduced portion at the outer side of said handle member for holding the handle member against the second plate member and retaining said second plate member in engagement with said opposed shoulders and said shoulder provided by said reduced portion, an extension upon each end of said first plate member and said second plate member, said extensions being in spaced apart relation to each other, and means upon said handle member for selectively engaging either of said extensions upon the plate members.

HELMER M. HAAGENSON.